United States Patent
Balocchi

(10) Patent No.: US 12,415,608 B2
(45) Date of Patent: Sep. 16, 2025

(54) DISTRIBUTED PNEUMATIC SUPPLY SYSTEM OF AN AIRCRAFT

(71) Applicant: LIEBHERR-AEROSPACE TOULOUSE SAS, Toulouse (FR)

(72) Inventor: Vincent Balocchi, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 947 days.

(21) Appl. No.: 17/549,799

(22) Filed: Dec. 13, 2021

(65) Prior Publication Data

US 2022/0204168 A1    Jun. 30, 2022

(30) Foreign Application Priority Data

Dec. 11, 2020 (FR) ...................................... 2013070

(51) Int. Cl.
*B64D 13/06* (2006.01)
*B64D 13/08* (2006.01)
*B64D 15/04* (2006.01)

(52) U.S. Cl.
CPC ............ *B64D 13/06* (2013.01); *B64D 13/08* (2013.01); *B64D 15/04* (2013.01); *B64C 2230/06* (2013.01); *B64D 2013/0611* (2013.01); *B64D 2013/0622* (2013.01)

(58) Field of Classification Search
CPC ............ B64D 13/06; B64D 2013/0611; B64D 2013/0622
See application file for complete search history.

(56) References Cited

U.S. PATENT DOCUMENTS

| 5,145,124 A * | 9/1992 | Brunskill | B64D 13/06 454/74 |
|---|---|---|---|
| 11,472,560 B2 * | 10/2022 | Pachidis | B64D 27/10 |
| 2013/0013145 A1 | 1/2013 | Ernst et al. | |
| 2016/0375987 A1 | 12/2016 | Shmilovich | |
| 2018/0141665 A1 | 5/2018 | Bezold et al. | |
| 2019/0383220 A1 | 12/2019 | Mackin | |

FOREIGN PATENT DOCUMENTS

CN          110510124         11/2019

OTHER PUBLICATIONS

"Airbus: A350-900: Flight Deck and System Briefing for Pilots," smartcockpit.com, Sep. 30, 2011.

* cited by examiner

Primary Examiner — Allen R. B. Schult
(74) Attorney, Agent, or Firm — CRGO Global; Steven M. Greenberg

(57) ABSTRACT

The invention relates to an air system for an aircraft, that includes air consumers; air sources and a network of ducts and associated control valves controlled by a control unit. The air system is characterized in that: the network of ducts and associated valves includes at least one isolation valve, arranged between an air bleed device and an air duct connecting an air conditioning pack and an auxiliary power unit; the control unit is configured to be able to determine an ideal configuration of the control valves according to the identified requirements of each consumer and a degraded configuration that makes it possible to supply air to predetermined air consumers from the available air sources when the ideal configuration is not attainable.

6 Claims, 1 Drawing Sheet

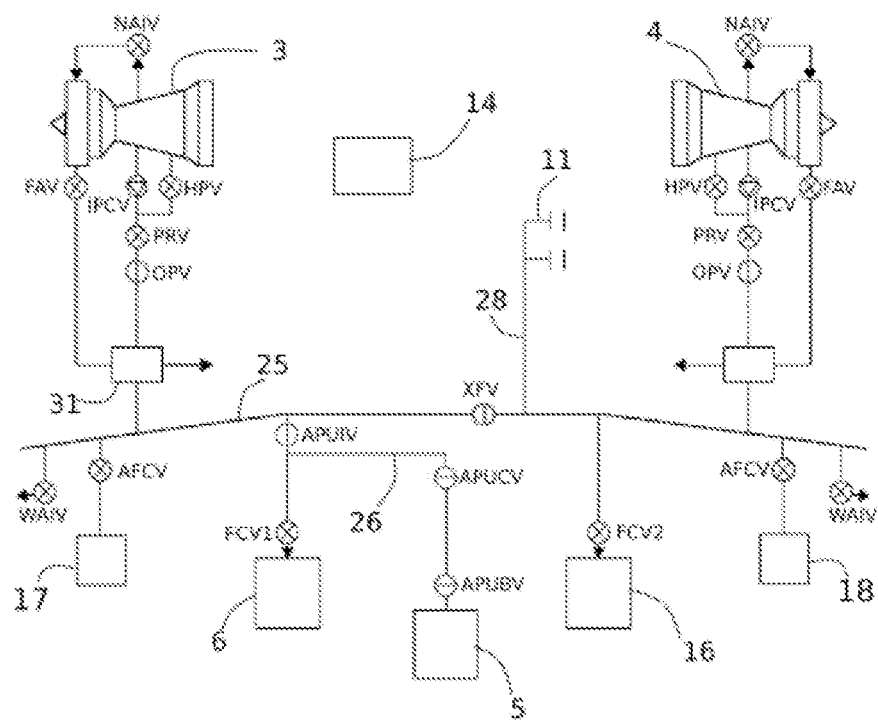

DISTRIBUTED PNEUMATIC SUPPLY SYSTEM OF AN AIRCRAFT

CROSS REFERENCE TO RELATED APPLICATIONS

This application claims priority under 35 U.S.C. § 119(a) to French patent application number 2013070, filed on Dec. 11, 2020, the entire teachings of which are incorporated herein by reference.

BACKGROUND OF THE INVENTION

Field of the Invention

The invention relates to an air system for an aircraft, including a plurality of air sources and a plurality of air consumers.

Description of the Related Art

Pneumatic systems are installed on commercial airplanes to perform functions of cabin pressurization, air conditioning, de-icing, inerting, etc. necessary for flight safety and human comfort.

Air management on board an aircraft is therefore crucial, both from the point of view of the energy efficiency of the aircraft and from the point of view of the safety of passengers and crew.

An air system (also referred by the terminology of a pneumatic system) of an aircraft is configured to allow a plurality of pneumatic consumers to be supplied with air from a plurality of air sources.

Most aircraft air systems thus include a plurality of air sources such as air bleed devices on the propulsion engines of the aircraft; auxiliary power units, better known by the acronym APU; external air intake scoops, better known under the name of "scoop inlet," possibly associated with electric compressors; etc., and a plurality of air consumers, such as air conditioning packs intended to supply air at controlled temperature and pressure in the cabin of the aircraft; wing anti-icing devices, better known by the acronym WAIS for "Wing Anti-Icing System"; tank inerting devices, etc.

In addition, introducing active flow control devices, hereinafter referred to as AFC devices, on the wings of the aircraft, the flaps, the vertical stabilizer and generally on any aerodynamic surface of the aircraft allows the aerodynamic behavior of the aircraft to be improved. The principle consists in locally blowing (or sucking) air through an AFC device to improve the properties of the flow.

This makes it possible to improve the performance of the control surfaces of the aircraft, that is to say to improve the lift or to reduce the drag of the aircraft with a reduction in fuel consumption.

By way of example, certain studies estimate that using AFC devices on the wings and on the vertical stabilizer allows the energy consumption of the aircraft to be reduced by 9%.

In general, new air consumers mounted on an aircraft (AFC devices or other additional air consumers) can be supplied from the existing pneumatic sources on the aircraft, for example the air taken from the main engines, better known under the name of "bleed air," or from dedicated electric compressors supplied by air taken from outside the aircraft, with modifications to the corresponding equipment. In the case where bleed air is used, it would now be necessary to increase the power and size of the bleed device so that the consumption of the new consumers such as AFC devices does not reduce the air supply to the other air consumers of the air system, and in particular to the air conditioning system of the aircraft.

For example, in the case of a conventional twin-engine airplane, the loss of air bleed from one engine due to engine failure or shutdown must be compensated for by the remaining engine. Also, each engine air bleed device is dimensioned to be able to meet all of the air requirements of the aircraft on its own. If it is desired to equip this twin-engine airplane with new air consumers such as AFC devices, it is then necessary to significantly increase the size of the bleed system in the nacelle and on the engine in order to be able to provide the air flow rate required for each system.

However, it has been shown that whatever option is chosen to supply the AFC devices, the benefits they provide are partly canceled out by the increase in the mass and/or the complexity of the air system necessary to provide the air flow to all air consumers (increase of the air bleed device or addition of a new pneumatic source, such as a dedicated electric compressor).

The inventors therefore sought to improve the architecture of the existing air systems in order to allow the supply of other consumers (including, but not limited to, AFC devices), but without impacting the overall size and/or the complexity of the air system. In other words, the inventors sought to develop an air system for an aircraft that can supply new air consumers without having to oversize the air sources for an aircraft that does not have these consumers.

BRIEF SUMMARY OF THE INVENTION

The invention aims to provide an air system for an aircraft including a plurality of air sources and a plurality of air consumers arranged on the aircraft that at least partially overcomes the drawbacks of known air systems.

The invention aims in particular to provide, in at least one embodiment, such an air system that allows the addition of new air consumers, such as active flow control devices, and which has an overall size and a complexity that are substantially identical to those of an air system that does not have such new air consumers.

The invention also aims to provide, in at least one embodiment, an air system that makes it possible to minimize the air consumption of active flow control devices.

The invention also aims to provide, in at least one embodiment, an air system that makes it possible to alleviate possible failures of one or more air sources while allowing the supply of at least some critical air consumers.

The invention also aims to provide, in at least one embodiment, an air system that allows the simultaneous use of different engine air sources and an auxiliary power unit.

The invention also aims to provide a method for managing air within an aircraft.

To this end, the invention relates to an air system for an aircraft, including:
- a plurality of air consumers including at least one air conditioning pack intended to supply an aircraft cabin with air at controlled temperature and pressure,
- a plurality of air sources including at least one air bleed device on a propulsion engine of the aircraft and at least one auxiliary power unit,
- a network of ducts and control valves configured to be able, on command from a control unit and/or according to flight conditions, to provide a fluid connection between the air sources and the air consumers.

The system according to the invention is characterized in that:
- the network of ducts and associated valves includes at least one valve, called an isolation valve, arranged between an air bleed device and an air duct connecting an air conditioning pack and the auxiliary power unit,
- the control unit is configured to be able to determine, from the air requirements of each air consumer and the available air sources, a configuration of the control valves, called the ideal configuration, that makes it possible to supply each air consumer with air according to the identified requirements, and a configuration, called the degraded configuration, that makes it possible to supply air to predetermined air consumers from the available air sources when the ideal configuration is not attainable.

An air system according to the invention therefore makes it possible to integrate a new air consumer, such as for example an AFC device, within an architecture of an air system by allowing a degraded operating mode when the air requirements are greater than the available air sources. In particular, a system according to the invention makes it possible to combine all the conventional air sources available on board an aircraft in order to supply an additional pneumatic consumer (or to supply an air consumer already present with a higher flow rate) without having to increase the maximum air bleed rate of an engine of an aircraft not provided with the additional consumer, nor that of the auxiliary power unit.

In particular, the system according to the invention determines the available air sources and the air requirements according to the flight conditions of the aircraft and can therefore switch from one air source to another or from one air consumer to another depending on these flight conditions.

For example, an auxiliary power unit generally no longer delivers air above a certain altitude. A wing anti-icing device (also referred to below as the "WAIS system") is no longer necessary above a certain altitude on most aircraft (31,000 feet on Airbus A320® aircraft). Likewise, an AFC device can be activated on certain flight phases, for example on take-off and landing in the event that the intrinsic performance of the wings needs to be improved during these phases, or else during cruising if it is sought to reduce consumption.

Thus, an assessment of the air sources and the air consumers according to the flight conditions allows the fluid connections between the sources and the consumers to be optimized so as to determine the ideal configuration.

In the event that this ideal configuration is not attainable, the system according to the invention makes it possible to establish a degraded configuration in which predetermined consumers (in particular the most critical) are supplied by the air sources.

To do this, the control unit is configured to determine the air requirements of each air consumer and the available air sources depending on the flight conditions. These air requirement and availability data are for example provided by the computers present on board the aircraft, such as the integrated air system controller (better known by the acronym IASC), the bleed management controller (better known by the acronym BMC), and in general any computer on board the aircraft capable of providing data related to a requirement or to an air source.

The degraded configuration aims to favor one or more air consumers depending on the available air sources and depending on the flight conditions.

For example, in the case of a twin-engine airplane, and in the event of failure of one of the two main engines, the air source associated with this main engine is no longer available, thus limiting the available air sources.

In the particular case where the aircraft includes an AFC device that forms an air consumer of the air system according to the invention, dedicated to the take-off and landing phases, and if the aircraft is in such a phase, the air supply to this device is a priority because an interruption would instantly affect the performance of the aircraft, degrading flight safety, while an interruption in the supply to the other systems such as the supply to the wing anti-icing system or the air conditioning system has no immediate effect and allows the pilot to reconfigure the air systems or the flight in order to continue the flight safely. The control unit can thus establish a degraded configuration that aims to maintain the uninterrupted supply of the most critical device to the detriment of the other consumers without compromising the safety of the flight.

Degraded configurations therefore depend on the available air sources and the flight conditions, making it possible to favor certain consumers to the detriment of other, lower priority consumers.

According to the invention, the network further includes at least one isolation valve, arranged between an air bleed device and an air duct connecting an air conditioning pack and the auxiliary power unit.

Thus, this air conditioning pack can be supplied with air directly by the auxiliary power unit (by fluidly separating this air duct from the air bleed device), including when this air bleed device is supplying other air consumers. In particular, in the event that one of the air bleed devices fails on a twin-engine aircraft, the system according to this variant allows the supply of an ECS pack by the auxiliary power unit and the supply of the other air consumers (for example, the AFC and WAIS devices) by the other available air sources. A system according to the invention therefore makes it possible to simultaneously supply the various air consumers of the aircraft, but without requiring the oversizing of the air sources.

An air system according to the invention can therefore include all types of air sources and all types of air consumers.

According to an advantageous variant of the invention, the plurality of air consumers includes at least one active flow control device (AFC device) mounted on the aircraft to improve the aerodynamic behavior of the aircraft and arranged downstream of a control valve controlled by the control unit.

Advantageously and according to this variant of the invention, the AFC devices and their supply valve, called the AFCV valve, are arranged immediately downstream of an air bleed device so as to be able to be supplied with hot air at a controlled temperature directly from this air bleed device.

This allows the AFC device to be supplied with hot air at a controlled temperature, of approximately 200° C., which makes it possible to reduce the mass air requirement. In particular, it has been shown that the air mass flow rate requirement of an AFC device is inversely proportional to the temperature of the air that is supplied thereto. Thus, an air system according to this variant of the invention makes it possible to optimize the air flow rate necessary for the AFC device, but without requiring the use of an air heating system. The AFC device benefits from temperature control at the outlet of the air bleed device on the propulsion engines of the aircraft (around 200° C. on conventional commercial airplanes) by virtue of its arrangement immediately downstream of the air bleed device.

Advantageously and according to the invention, the system further includes means for monitoring the air supply to each active air flow control device.

This advantageous variant makes it possible to check the correct air supply to the AFC devices of the air system. These monitoring means are for example formed by one or more sensors arranged downstream of the control valve of this AFC device or directly by the control valve of this device.

Advantageously and according to the invention, the system includes two air bleed devices arranged respectively on two separate propulsion engines arranged on each wing of the aircraft and a valve, called an interconnect valve, fluidly arranged between the two air bleed devices so as to allow only one of the two air bleed devices to supply both sides of the aircraft in the event that the other air bleed device fails.

A system according to this variant thus makes it possible to alleviate the failures of an air bleed device of a propulsion engine on a twin-engine aircraft by making it possible to ensure a fluid connection between the sides of the aircraft so that the working air bleed device can supply the air consumers supplied (in the absence of a failure) by the air source formed by the faulty air bleed device (or by the air bleed device associated with a faulty engine). The interconnect valve (also referred to by the acronym XFV) is configured to provide fluid communication between the two subsystems of the air system.

Advantageously and according to the invention, at least one AFC device is arranged on each wing of the aircraft and the control unit is configured to supply this AFC device with air only during the take-off and landing phases.

The invention also relates to a method for managing air within an aircraft including at least a plurality of air consumers including at least one air conditioning pack and a plurality of air sources including at least one air bleed device on a propulsion engine of the aircraft and at least one auxiliary power unit, a control unit, a network of ducts and control valves configured to allow the air sources to be fluidly connected to the air consumers on command from the control unit, characterized in that the method includes the steps of:

determining the air requirements of each air consumer and the available air sources,
  determining a configuration, called the ideal configuration, that makes it possible to supply air, on command from the control valves, to each air consumer according to the identified requirements,
  determining a configuration, called the degraded configuration, that makes it possible to supply air, on command from the control valves, to predetermined air consumers from the available air sources when the ideal configuration is not attainable.

An air management method according to the invention is advantageously implemented in an air management system according to the invention and an air system according to the invention advantageously implements a method according to the invention.

The control valves can be controlled, depending on the type of valve in question, by the control unit or spontaneously according to variations in flight conditions (for example in the case of pneumatic control valves that react to variations in opening/closing pneumatic conditions).

The advantages of an air system according to the invention apply, mutatis mutandis, to an air management method according to the invention.

The invention also relates to an air system and an air management method that are characterized in combination by all or some of the features mentioned above or below.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic view of an air system according to one embodiment of the invention.

DETAILED DESCRIPTION OF THE INVENTION

For the sake of illustration and clarity, scales and proportions are not strictly adhered to in the FIGURE.

FIG. 1 illustrates an air system of a twin-engine aircraft according to one embodiment of the invention.

The two propulsion engines of the aircraft are referenced 3 and 4 in FIG. 1.

The air system according to the embodiment of FIG. 1 is formed of two subsystems that extend respectively and generally on the right wing and the left wing of the aircraft. Also and throughout what follows, only the air subsystem in connection with the propulsion engine 3 is described, it being understood that the other air subsystem in connection with the propulsion engine 4 has a substantially identical architecture and operation except for a few details that will be specified later.

Furthermore, the various ducts of the air system are not systematically referenced for the sake of clarity. Only the specific ducts that do not obviously follow from the present description are referenced in FIG. 1.

The air system according to the invention includes a control unit 14 configured to control at least some of the control valves of the air system. The control connections between the control unit 14 and the various control valves controlled by the unit are not shown in FIG. 1 for the sake of clarity. Those skilled in the art will easily understand that this control unit is connected, directly or indirectly, to each of the control valves in order to control the openings and closings of the valves according to the targeted configurations. The control logics of these valves according to the targeted configurations are described later. Likewise, the control unit is configured to determine the balance of the available pneumatic sources and the air requirements of the air consumers. The connections allowing the control unit to retrieve the corresponding information are not shown in FIG. 1 for the sake of clarity.

The air system according to the embodiment of FIG. 1 includes an air bleed device on the propulsion engine 3. This air bleed device is configured to take high pressure air from the engine by a high pressure valve, referenced HPV in FIG. 1, or by an intermediate pressure port from a non-return valve, referenced IPCV in FIG. 1. The flow taken from the engine passes through a pressure regulating valve, referenced PRV in FIG. 1. The air flow from this valve PRV then passes through an overpressure protection valve, referenced OPV in FIG. 1, then through a heat exchanger 31, better known by the name "precooler." This heat exchanger 31 is intended to cool the high pressure air coming from the valve OPV with air coming from the secondary flow of the engine 3, better known under the name of FAN air. This FAN air is controlled by a control valve, referenced FAV in FIG. 1.

The air at a controlled temperature around 200° C. at the outlet of the hot pass of the precooler 31 is intended to supply the various consumers of the aircraft by means of a duct 25 that it supplies. The air leaving the cold pass of the precooler is generally discharged outside the aircraft via a duct 22.

The air system according to the invention further includes an auxiliary power unit 5 that forms an air source of the system. This auxiliary power unit 5 is connected to an air conditioning pack 6 via a duct 26. The duct 26 is provided with a non-return valve, referenced APUCV, with a control valve, referenced APUBV in FIG. 1 and with an air conditioning pack control valve referenced FCV1 in FIG. 1.

This assembly formed by the duct 26, by the valves FCV1, APUBV and by the valve APUCV forms an air circuit that can be autonomous by the activation of an isolation valve, referenced APUIV, and configured to allow this circuit to be isolated from the duct 25. Thus, the auxiliary power unit 5 can directly supply the air conditioning pack 6, including when the air from the propulsion engine 3 is already used by other consumers.

The air system according to the embodiment of FIG. 1 also includes two AFC devices 17, 18 each arranged downstream of a control valve, referenced AFCV in FIG. 1. The AFC device 17 of the subsystem described in connection with the engine 3 and its associated AFCV valve are arranged directly downstream of the precooler 31 so that this AFC device 17 can be supplied on command from the control unit with hot air at the outlet of the precooler.

The air system also includes a wing anti-icing device supplied by a control valve referenced WAIV in FIG. 1.

In FIG. 1, the system also includes a nacelle anti-icing device supplied with air by a control valve referenced NAIV in FIG. 1. This valve is supplied by intermediate pressure air coming directly from the propulsion engine. This device is therefore an air consumer of the air system.

As indicated above, the air system is formed of two substantially identical subsystems, with the exception of the auxiliary engine 5, which is not duplicated on the two subsystems, and of a duct 28 for connection to a connector 11 intended to receive air supply equipment on the ground. This equipment is used on the ground to supply the air system with air when the propulsion engines 3, 4 and the auxiliary power unit 5 cannot be used. As such, the second subsystem also includes an air conditioning pack 16 and an air conditioning pack control valve referenced FCV2 in FIG. 1.

The two subsystems (right and left) of the air system are connected to each other by an interconnect valve referenced XFV in FIG. 1 so that one of the two subsystems can supply the other subsystem if necessary (failure of an engine or failure of the air bleed device associated with one of the engines). The valve XFV is fluidly arranged between the two subsystems of the air system, that is to say it allows the two air subsystems to be placed in fluid communication, and in particular allows one subsystem to be supplied by the air bleed device of the other subsystem and vice versa.

The air system according to the embodiment of FIG. 1 makes it possible to obtain all of the configurations specified in the table below, in which the failure referenced M1 designates a failure of the propulsion engine or of its air bleed system of the first subsystem referenced 3 in FIG. 1, and the failure referenced M2 designates a failure of the propulsion engine or of its air bleed system of the second subsystem referenced 4 in FIG. 1.

The failure referenced ECS1 designates a failure of the air conditioning pack of the first subsystem referenced 6 in FIG. 1 and the failure ECS2 designates a failure of the air conditioning pack of the second subsystem referenced 16 in FIG. 1. "None" denotes an absence of failure.

With regard to the air consumers, AFC denotes an active flow control device of the airplane, WAI an anti-icing device of the airplane, ECS1 the first air conditioning pack and ECS2 the second air conditioning pack.

In connection with the air consumers, ON indicates that the consumer is supplied with air by the system or that the source is supplying air to the system. OFF indicates that the consumer is not supplied with air or that the source is not supplying air to the system.

With regard to the air sources and distribution means, Bleed1 designates the air taken from the propulsion engine of the first subsystem, Bleed2 designates the air taken from the propulsion engine of the second subsystem, APU designates the air supplied by the auxiliary engine referenced 5 in FIG. 1, XFV designates the valve for placing the two subsystems in fluid communication, and APUIV designates the valve for isolating the circuit formed by the duct 26, the APU 5 and the ECS1 6 and ECS2 16 packs from the rest of the air system.

In connection with the air sources, ON indicates that the air source is supplying air to the air system and OFF indicates that the air source is not supplying air to the air system. ON/OFF indicates whether or not the air source can supply air without significantly changing the behavior of the air system.

With regard to the valves, OP indicates that the valve is open and is allowing the passage of air. CL indicates that the valve is closed and is blocking the passage of air. OP/CL indicates that the valve can be opened or closed without substantially modifying the air distribution logic

|  | Air consumers | | | | Air sources and valves | | | | |
| --- | --- | --- | --- | --- | --- | --- | --- | --- | --- |
| Failure | AFC | WAI | ECS1 | ECS2 | Bleed1 | Bleed2 | APU | XFV | APUIV |
| None | OFF | OFF | ON | ON | ON | ON | OFF | OP/CL | OP |
| None | ON | OFF | ON | ON | ON | ON | OFF | OP | OP |
| None | ON | ON | ON | ON | ON | ON | OFF | OP | OP |
| None | OFF | ON | ON | ON | ON | ON | OFF | OP/CL | OP |
| M1 | OFF | OFF | 1 or 2 ECS ON | | OFF | ON | OFF | OP/CL | OP |

-continued

| | Air consumers | | | | Air sources and valves | | | | |
|---|---|---|---|---|---|---|---|---|---|
| Failure | AFC | WAI | ECS1 | ECS2 | Bleed1 | Bleed2 | APU | XFV | APUIV |
| M1 | ON | OFF | 1 ECS | ON | OFF | ON | OFF | OP | OP |
| M1 | ON | ON | ON | OFF | OFF | ON | ON | OP | CL |
| M1 | OFF | ON | 1 ECS | ON | OFF | ON | OFF | OP | OP |
| M2 | OFF | OFF | 1 or 2 ECS | ON | ON | OFF | OFF | OP/CL | OP |
| M2 | ON | OFF | 1 ECS | ON | ON | OFF | OFF | OP | OP |
| M2 | ON | ON | ON | OFF | ON | OFF | ON | OP | CL |
| M2 | OFF | ON | 1 ECS | ON | ON | OFF | OFF | OP | OP |
| ECS1 | OFF | OFF | OFF | ON | OFF | ON | OFF | OP/CL | OP |
| ECS1 | ON | OFF | OFF | ON | ON/OFF | ON | OFF | OP | OP |
| ECS1 | ON | ON | OFF | ON | ON | ON | OFF | OP/CL | OP |
| ECS1 | OFF | ON | OFF | ON | OFF | ON | OFF | OP/CL | OP |
| ECS2 | OFF | OFF | ON | OFF | ON | OFF | OFF | OP/CL | OP |
| ECS2 | ON | OFF | ON | OFF | ON | ON/OFF | OFF | OP | OP |
| ECS2 | ON | ON | ON | OFF | ON | ON | OFF | OP/CL | OP |
| ECS2 | OFF | ON | ON | OFF | ON | OFF | OFF | OP/CL | OP |

It can be seen on reading the table above that the air system makes it possible to keep the AFC device operational even when a propulsion engine or its air bleed system is lost (failure M1 or M2).

It is in particular possible to fluidly connect the two subsystems by opening the valve XFV when the AFC devices are supplied and to balance the air flows between the two engine bleed devices.

In addition, the system makes it possible, owing to the valve APUIV, to ensure continuity of the air supply to the AFC devices, including during the transitional reconfiguration period of the air system. In fact, the air conditioning pack is then supplied by the auxiliary power unit and the air bleed device of the active engine supplies the critical air consumers, while the air system is reconfigured.

A system according to the invention makes it possible to isolate the air conditioning packs by closing the valve APUIV and to simultaneously use all the available air sources.

It is known that an auxiliary unit does not supply air above a certain altitude. However, the table above covers all possible configurations of failures and source availability because the WAIS system is not necessary beyond a certain altitude (31,000 feet for the Airbus A320®) and the need to activate the AFC device (in the case of a device arranged on the pylon wing junction) is limited to the landing and take-off phases up to an estimated altitude of 22,000 feet.

A system according to the embodiment of FIG. 1 also makes it possible to simultaneously supply the WAIS on both sides of the aircraft and the air conditioning system with a single air bleed device.

The system according to the embodiment of FIG. 1 therefore makes it possible to control and supply one or more active flow devices simultaneously with the other air consumers already present on an aircraft, including during the most common failures, without requiring increased bleed air flow rates or air sources.

The presence of the valve APUIV makes it possible to have a head start on the next failure of the air system by allowing different reconfigurations according to the flight conditions, the air requirements and the availability of the air sources.

In the proposed configurations, the occurrence of a failure does not interrupt the operation of the AFC device, which is permanently connected to a supply air source.

FIG. 1 illustrates an air system according to one embodiment of the invention, in which AFC devices are added to a conventional air system.

According to a variant not shown, the air system can also be devoid of AFC devices, but while implementing the same architecture to allow, for example, two levels of temperature regulation of the WAIS devices or a supply of another air consumer with higher air flow rate depending on flight conditions.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An air system for an aircraft, comprising:
a plurality of air consumers including at least one air conditioning pack intended to supply an aircraft cabin with air at controlled temperature and pressure, and at least one active flow control device mounted on the aircraft to improve the aerodynamic behavior of the aircraft, a plurality of air sources including at least one air bleed device on a propulsion engine of the aircraft and at least one auxiliary power unit, a network of ducts and control valves configured to be able, on command from a control unit and/or according to flight conditions, to provide a fluid connection between said air sources and said air consumers, wherein:

said network of ducts and associated valves comprises at least one valve, called an isolation valve, arranged between an air bleed device and an air duct connecting an air conditioning pack and said auxiliary power unit, said control unit is configured to be able to determine, from the air requirements of each air consumer and the available air sources, a configuration of the control valves, called the ideal configuration, that makes it possible to supply each air consumer with air according to the identified requirements, and a configuration, called the degraded configuration, that makes it possible to supply air to predetermined air consumers from said available air sources when said ideal configuration is not attainable;

said at least one active flow control device and its associated valve being arranged downstream of a control valve controlled by said control unit, and immediately downstream of an air bleed device so as to be able to be supplied with hot air at a controlled temperature directly from this air bleed device.

2. The air system according to claim 1, characterized in that it further comprises means for monitoring the air supply to each active flow control device.

3. The air system according to claim 1, characterized in that at least one active flow control device is arranged on each wing of the aircraft and in that said control unit is configured to control the air supply to each active flow device only during the take-off and landing phases.

4. The air system according to claim 1, characterized in that it comprises two air bleed devices arranged respectively on two separate propulsion engines arranged on each side of the aircraft and in that it comprises a valve, called an interconnect valve, arranged between the two air bleed devices so as to allow only one of the two air bleed devices to supply both sides of the aircraft in the event that the other air bleed device fails.

5. The air system according to claim 1, characterized in that it further comprises at least one device for de-icing the wings of the aircraft arranged downstream of at least one active flow device.

6. A method for managing air within an aircraft, comprising the steps of:

providing at least a plurality of air consumers including at least one air conditioning pack and a plurality of air sources including at least one air bleed device on a propulsion engine of the aircraft, at least one auxiliary power unit and at least one active flow control device mounted on the aircraft to improve the aerodynamic behavior of the aircraft, a control unit, a network of ducts and control valves configured to allow said air sources to be fluidly connected to said air consumers on command from said control unit, said at least one active flow control device and its associated valve being arranged downstream of a control valve controlled by said control unit, and immediately downstream of an air bleed device so as to be able to be supplied with hot air at a controlled temperature directly from this air bleed device, determining the air requirements of each air consumer and the available air sources, determining a configuration, called the ideal configuration, that makes it possible to supply air, on command from said control valves by said control unit, to each air consumer according to the identified requirements, determining a configuration, called the degraded configuration, that makes it possible to supply air, on command from said control valves by said control unit, to predetermined air consumers from said available air sources when said ideal configuration is not attainable.

* * * * *